United States Patent
Ichikawa et al.

(10) Patent No.: US 10,328,816 B2
(45) Date of Patent: Jun. 25, 2019

(54) HYBRID VEHICLE, COOPERATION SYSTEM, AND CONTROL METHOD FOR HYBRID VEHICLE

(71) Applicant: TOYOTA JIDOSHA KABUSHIKI KAISHA, Toyota-shi, Aichi-ken (JP)

(72) Inventors: Shinji Ichikawa, Toyota (JP); Hiroaki Takeuchi, Toyota (JP); Ryuta Ishida, Okazaki (JP); Hiroaki Arakawa, Nagakute (JP); Shigeki Kinomura, Toyota (JP); Keita Hashimoto, Toyota (JP); Akio Uotani, Toyota (JP); Kazuyuki Kagawa, Toyota (JP); Yusuke Kinoshita, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 267 days.

(21) Appl. No.: 15/467,296

(22) Filed: Mar. 23, 2017

(65) Prior Publication Data
US 2017/0282740 A1 Oct. 5, 2017

(30) Foreign Application Priority Data
Mar. 30, 2016 (JP) ................ 2016-069249

(51) Int. Cl.
*B60L 1/02* (2006.01)
*B60L 11/18* (2006.01)
(Continued)

(52) U.S. Cl.
CPC .......... *B60L 11/1861* (2013.01); *B60L 1/02* (2013.01); *B60L 11/02* (2013.01); *B60L 11/12* (2013.01);
(Continued)

(58) Field of Classification Search
CPC ........ B60L 11/1861; B60L 11/02; B60L 1/02; B60L 11/12; B60L 11/1811;
(Continued)

(56) References Cited

U.S. PATENT DOCUMENTS

2009/0242288 A1 10/2009 Oyobe et al.
2012/0007554 A1 1/2012 Kanamori et al.
(Continued)

FOREIGN PATENT DOCUMENTS

DE 102010003887 A1 10/2011
JP 8-19114 1/1996
(Continued)

*Primary Examiner* — Carlos Amaya
(74) *Attorney, Agent, or Firm* — Finnegan, Henderson, Farabow, Garrett & Dunner, LLP (57) ABSTRACT

When a use index indicative of a degree of use of external charging is less than a threshold, an electronic control unit determines that the degree of use of external charging is low, and executes a charging guide control to promote the use of external charging at the time of parking at a battery charging point, such as at home or in a battery charging station, where the external charging is performable. Hereby, it is possible to promote a driver to use external charging at the time of parking at the battery charging point. As a result, the use of external charging can be promoted.

10 Claims, 6 Drawing Sheets (51) Int. Cl.
- *B60L 11/02* (2006.01)
- *H02J 7/00* (2006.01)
- *B60W 50/14* (2012.01)
- *B60W 20/00* (2016.01)
- *B60L 11/12* (2006.01)
- *B60K 6/20* (2007.10)
- *B60K 6/445* (2007.10)
- *B60W 50/12* (2012.01)
- *B60W 40/09* (2012.01)

(52) U.S. Cl.
CPC ....... *B60L 11/1811* (2013.01); *B60L 11/1816* (2013.01); *B60L 11/1818* (2013.01); *B60W 20/00* (2013.01); *B60W 50/14* (2013.01); *H02J 7/0021* (2013.01); *H02J 7/0045* (2013.01); *B60K 6/20* (2013.01); *B60K 6/445* (2013.01); *B60L 2240/80* (2013.01); *B60L 2250/16* (2013.01); *B60W 40/09* (2013.01); *B60W 50/12* (2013.01); *B60W 2050/143* (2013.01); *B60W 2050/146* (2013.01); *B60W 2510/242* (2013.01); *B60W 2520/04* (2013.01); *B60W 2520/10* (2013.01); *B60W 2530/14* (2013.01); *B60W 2550/402* (2013.01); *Y02T 10/6239* (2013.01); *Y02T 10/6269* (2013.01); *Y02T 10/7005* (2013.01); *Y02T 10/705* (2013.01); *Y02T 10/7044* (2013.01); *Y02T 10/7072* (2013.01); *Y02T 10/7077* (2013.01); *Y02T 90/127* (2013.01); *Y02T 90/14* (2013.01); *Y10S 903/903* (2013.01)

(58) Field of Classification Search
CPC .............. B60L 11/1816; B60L 11/1818; B60L 2240/80; B60L 2250/16; B60W 20/00; B60W 50/14; B60W 40/09; B60W 50/12; B60W 2050/143; B60W 2050/146; B60W 2510/242; B60W 2520/04; B60W 2520/10; B60W 2530/14; B60W 2550/402; H02J 7/0021; H02J 7/0045; B60K 6/20; B60K 6/445; Y02T 10/6239; Y02T 10/6269; Y02T 10/7005; Y02T 10/7044; Y02T 10/705; Y02T 10/7072; Y02T 10/7077; Y02T 90/127; Y02T 90/14; Y10S 903/903

See application file for complete search history.

(56) References Cited

U.S. PATENT DOCUMENTS

| | | | |
|---|---|---|---|
| 2012/0296504 A1* | 11/2012 | Haraki | B60L 11/1816 701/22 |
| 2013/0218402 A1 | 8/2013 | Hoshihara et al. | |
| 2013/0226379 A1 | 8/2013 | Hirai | |

FOREIGN PATENT DOCUMENTS

| | | |
|---|---|---|
| JP | 2007-066358 A | 3/2007 |
| JP | 2009-126456 A | 6/2009 |
| WO | WO 2012/049559 A2 | 4/2012 |
| WO | WO2012/101681 A1 | 8/2012 |

* cited by examiner

HYBRID VEHICLE, COOPERATION SYSTEM, AND CONTROL METHOD FOR HYBRID VEHICLE

INCORPORATION BY REFERENCE

The disclosure of Japanese Patent Application No. 2016-069249 filed on Mar. 30, 2016 including the specification, drawings and abstract is incorporated herein by reference in its entirety.

BACKGROUND

1. Technical Field

The disclosure is a hybrid vehicle, a cooperation system, and a control method for a hybrid vehicle. More specifically, the disclosure relates to a hybrid vehicle that is configured such that charging of a battery by a charger and refueling of a fuel tank are carried out, a cooperation system between the hybrid vehicle and a vehicle external device, and a control method for a hybrid vehicle.

2. Description of Related Art

Japanese Patent Application Publication No. 8-19114 (JP 8-19114 A) proposes a hybrid vehicle in which at least one of the output of an electric motor and the output of an internal combustion engine is limited when the change in parameter that depends on the quantity of fuel use by the internal combustion engine after external charging of a battery has reached a predetermined value. With this hybrid vehicle, a driver is urged to carry out external charging of the battery by the limitation of at least one of the output of the electric motor and the output of the internal combustion engine when the change in parameter has reached the predetermined value, thereby facilitating the travel of the vehicle not relying on the internal combustion engine. Consequently, the effect of suppressing air pollution, which is the primary purpose of an electric vehicle, can be sufficiently obtained while leaving a margin such that the vehicle can travel by the internal combustion engine in an emergency.

SUMMARY

With the hybrid vehicle described above, however, only by limiting at least one of the output of the electric motor and the output of the internal combustion engine, there are those instances where the effect of urging the use of external charging is insufficient. For example, for a driver who always drives the vehicle to travel with relatively low power, the effect of the output limitation of the electric motor or the internal combustion engine is small.

A hybrid vehicle, a cooperation system, and a control method for a hybrid vehicle according to the disclosure are intended to promote use of external charging.

A first aspect of the disclosure relates to a hybrid vehicle. The hybrid vehicle includes an engine, a fuel tank, a motor, a battery, a charger, and an electronic control unit. The fuel tank stores fuel to be supplied to the engine. The battery is configured to supply electric power to the motor. The charger is configured to carry out external charging that charges the battery by use of electric power from an external power source. The electronic control unit is configured to execute a charging guide control to promote use of external charging during parking at a battery charging point when a use index is less than or equal to a predetermined threshold value. The use index is an index to indicate a degree of use of external charging in a predetermined time period. The battery charging point is point where the external charging is performable.

According to the above configuration, when a use index is less than or equal to a predetermined threshold value (the degree of use of external charging is low), the electronic control unit executes the charging guide control to promote the use of external charging during parking at the battery charging point where the external charging is performable. That is, when the use index is less than or equal to a threshold value, the electronic control unit promotes a driver to use the external charging during parking at the battery charging point. Hereby, the use of external charging can be promoted. This accordingly makes it possible to achieve a reduction in environment load.

The hybrid vehicle may further include a display device. The electronic control unit may be configured to execute a control to display information to promote the use of external charging on the display device when the electronic control unit executing the charging guide control.

The hybrid vehicle may further include a speaker. The electronic control unit may be configured to execute at least one of an audio outputting control and an alarm outputting control when the electronic control unit executes the charging guide control, the audio outputting control is a control to output an audio from the speaker. The alarm outputting control is a control to output an alarm from the speaker until the charger is connected to the external power source.

In the hybrid vehicle, the charger may include a charging inlet and a charging inlet lid. The charging inlet may be configured to be connected to a charger cable of the external power source, and the charging inlet lid may be configured to cover the charging inlet. The electronic control unit may be configured to execute a control to open the charging inlet lid such that the charging inlet is connected to the charger cable when the electronic control unit executes the charging guide control.

The hybrid vehicle may further include an air-conditioning device. Further, the electronic control unit may be configured to execute a control to permit setting of pre-air conditioning by the air-conditioning device when the charger is connected to the external power source during executing the charging guide control by the electronic control unit.

According to the above configuration, the electronic control unit performs display or audio output of information that promotes the use of external charging, thereby making it possible to promote a driver to use external charging.

In the hybrid vehicle, the electronic control unit may be configured not to execute the charging guide control at least one of a time when the external charging is unnecessary to carry out and a time when the external charging is not performable during parking at the battery charging point with the use index being less than or equal to the predetermined threshold value, at least when it is not necessary to carry out the external charging or when the external charging is not performable, the electronic control unit does not execute the charging guide control. With such a configuration, it is possible to avoid making a user feel inconvenience needlessly.

In the hybrid vehicle, the time when the external charging is unnecessary to carry out may be at least one of a time when the battery is fully charged and a time when a current battery charging point is not a predetermined battery charging point. With such a configuration, when it is not necessary to perform external charging and the like because the battery is fully charged, it is possible to avoid making a user feel inconvenience needlessly by the execution of the charging guide control.

Further, in the hybrid vehicle, the time when the external charging is not performable may be at least one of a time when a charging facility including the external power source at the battery charging point is during a power failure, a time when the external power source has an abnormality, and a time when a connection with the external power source is occupied by another vehicle. With such a configuration, when the external charging is not performable because of a power failure of the charging facility or the like reason, it is possible to avoid making a user feel inconvenience needlessly by the execution of the charging guide control.

A second aspect of the present disclosure relates to a cooperation system. The cooperation system includes a hybrid vehicle, and a vehicle external device including a control device. The hybrid vehicle includes an engine, a fuel tank, a motor, a battery, a charger, a communication device, and an electronic control unit. The fuel tank stores fuel to be supplied to the engine. The battery is configured to supply electric power to the motor. The charger is configured to carry out external charging that charges the battery by use of electric power from an external power source. The communication device is configured to transmit information to the vehicle external device. The electronic control unit is configured to transmit at least one of information of a use index and information of a request of a charging guide control to the vehicle external device by the communication device during parking at a battery charging point when the use index is less than or equal to a predetermined threshold value. The use index is an index to indicate a degree of use of the external charging in a predetermined time period. The battery charging point is a point where the external charging is performable, the charging guide control being a control to promote use of the external charging. The control device of the vehicle external device is configured to execute the charging guide control when the control device receives the information that is transmitted from the hybrid vehicle.

In the above configuration, when a use index is less than or equal to a predetermined threshold value, the hybrid vehicle transmits, to the vehicle external device, the use index or a request of the charging guide control to promote the use of external charging during parking at the battery charging point where the external charging is performable. When the vehicle external device receives the use index or the request of the charging guide control from the hybrid vehicle, the vehicle external device executes the charging guide control. That is, when a use index is less than or equal to the threshold value, the electronic control unit promotes a driver to use external charging at the time of parking at the battery charging point. Hereby, the use of external charging can be promoted. This accordingly makes it possible to achieve a reduction in environment load.

A third aspect of the disclosure relates to a control method for a hybrid vehicle. The hybrid vehicle includes an engine, a fuel tank, a motor, a battery, a charger, and an electronic control unit. The fuel tank stores fuel to be supplied to the engine. The battery is configured to supply electric power to the motor. The charger is configured to carry out external charging that charges the battery by use of electric power from an external power source. The electronic control unit is configured to execute a charging guide control to promote the use of external charging during parking at a battery charging point when a use index less than or equal to a predetermined threshold value. The use index is an index to indicate a degree of use of external charging in a predetermined time period. The battery charging point being a point where the external charging is performable.

According to the above configuration, when a use index is less than or equal to a predetermined threshold value (the degree of use of external charging is low), the electronic control unit executes the charging guide control to promote the use of external charging during parking at the battery charging point where the external charging is performable. That is, when the use index is less than or equal to a threshold value, the electronic control unit promotes a driver to use external charging during parking at the battery charging point. Hereby, the use of external charging can be promoted. This accordingly makes it possible to achieve a reduction in environment load.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Now, modes for carrying out the disclosure will be described with reference to embodiments.

Figure 1:
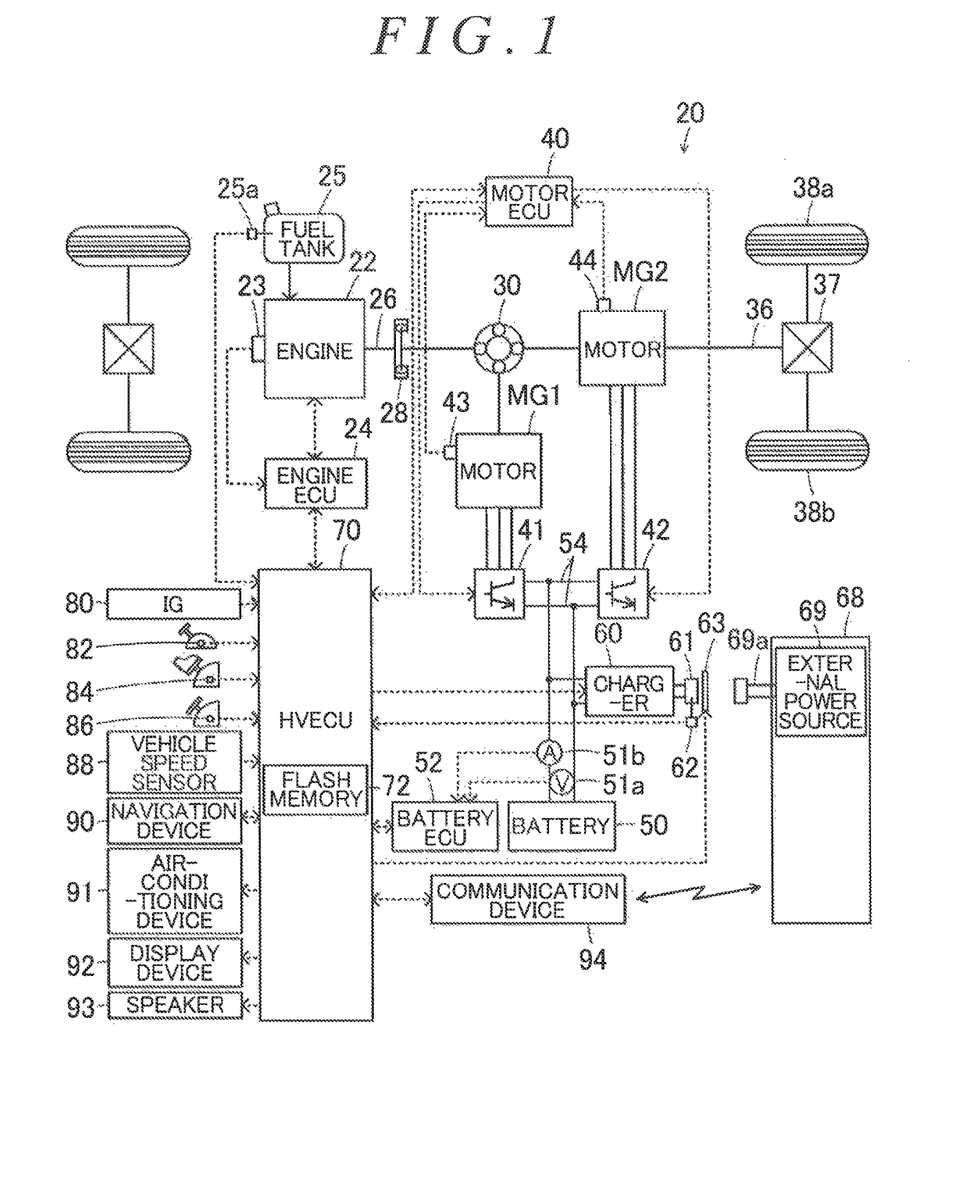
FIG. 1 is a configuration diagram schematically illustrating a configuration of a hybrid vehicle 20 according to an embodiment of the present disclosure.

FIG. 1 is a configuration diagram schematically illustrating a configuration of a hybrid vehicle 20 according to an embodiment of the present disclosure. As illustrated in FIG. 1, the hybrid vehicle 20 of the embodiment includes an engine 22, a planetary gear 30, motors MG1 and MG2, inverters 41 and 42, a battery 50, a charger 60, a navigation device 90, an air-conditioning device 91, a display device 92, a speaker 93, a communication device 94, and a hybrid electronic control unit (hereinafter referred to as an "HVECU") 70.

The engine 22 is configured as an internal combustion engine that uses fuel such as gasoline or diesel fuel from a fuel tank 25 to output power. The operation of the engine 22 is controlled by an engine electronic control unit (hereinafter referred to as an "engine ECU") 24, Although not shown, the engine ECU 24 is configured as a microprocessor including a CPU as its main component and, in addition to the CPU, includes a ROM that stores processing programs, a RAM that temporarily stores data, input and output ports, and a communication port. Signals from various sensors that are necessary for controlling the operation of the engine 22, such as, for example, a crank angle θcr from a crank position sensor 23 that detects a rotational position of a crankshaft 26 of the engine 22, are input to the engine ECU 24 via the input port. Various control signals for controlling the operation of the engine 22 are output from the engine ECU 24 via the output port. The engine ECU 24 is connected to the HVECU 70 via the communication port. The engine ECU 24 calculates a rotational speed Ne of the engine 22 based on the crank angle θcr from the crank position sensor 23.

The planetary gear 30 is configured as a single-pinion type planetary gear mechanism. A rotor of the motor MG1 is connected to a sun gear of the planetary gear 30. A drive shaft 36 coupled to drive wheels 38a and 38b via a differential gear 37 is connected to a ring gear of the planetary gear 30. The crankshaft 26 of the engine 22 is connected to a carrier of the planetary gear 30 via a damper 28.

The motor MG1 is configured as, for example, a synchronous generator motor, and as described above, the rotor of the motor MG1 is connected to the sun gear of the planetary gear 30. The motor MG2 is configured as, for example, a synchronous generator motor, and a rotor of the motor MG2 is connected to the drive shaft 36. The inverters 41 and 42 are connected to the battery 50 via an electric power line 54. The motors MG1 and MG2 are rotationally driven by the inverters 41 and 42, respectively, when a plurality of switching elements (not shown) of the inverters 41 and 42 are switching-controlled by a motor electronic control unit (hereinafter referred to as a "motor ECU") 40.

Although not shown, the motor ECU 40 is configured as a microprocessor including a CPU as its main component and, in addition to the CPU, includes a ROM that stores processing programs, a RAM that temporarily stores data, input and output ports, and a communication port. Signals from various sensors that are necessary for drivingly controlling the motors MG1 and MG2, such as, for example, rotational positions θm1 and θm2 from rotational position detection sensors 43 and 44 that respectively detect rotational positions of the rotors of the motors MG1 and MG2, are input to the motor ECU 40 via the input port. Switching control signals for the switching elements (not shown) of the inverters 41 and 42 and so on are output from the motor ECU 40 via the output port. The motor ECU 40 is connected to the HVECU 70 via the communication port. The motor ECU 40 calculates rotational speeds Nm1 and Nm2 of the motors MG1 and MG2 based on the rotational positions θm1 and θm2 of the rotors of the motors MG1 and MG2 from the rotational position detection sensors 43 and 44.

The battery 50 is configured as, for example, a lithium-ion secondary battery or a nickel-hydrogen secondary battery. As described above, the battery 50 is connected to the inverters 41 and 42 via the electric power line 54. The battery 50 is managed by a battery electronic control unit (hereinafter referred to as a "battery ECU") 52.

Although not shown, the battery ECU 52 is configured as a microprocessor including a CPU as its main component and, in addition to the CPU, includes a ROM that stores processing programs, a RAM that temporarily stores data, a flash memory, input and output ports, and a communication port. Signals from various sensors that are necessary for managing the battery 50, such as, for example, a battery voltage Vb from a voltage sensor 51a disposed between terminals of the battery 50 and a battery current Ib from a current sensor 51b attached to the output terminal of the battery 50, are input to the battery ECU 52 via the input port. The battery ECU 52 is connected to the HVECU 70 via the communication port. The battery ECU 52 calculates a state of charge SOC based on an integrated value of the battery current Ib from the current sensor 51b. The state of charge SOC is a ratio of the capacity of electric power, that can be discharged from the battery 50, to the full capacity of the battery 50.

The charger 60 is connected to the electric power line 54, and a charging inlet lid 63 covering a charging inlet 61 connected to the charger 60 is opened at a battery charging point such as at home or a battery charging station. When the charging inlet 61 is connected to a charger cable 69a connected to an external power source 69 such as a household power source or an industrial power source at a charging facility 68, the charger 60 can carry out external charging that charges the battery 50 using electric power from the external power source 69.

The navigation device 90 includes a body incorporating a control unit having a storage medium such as a hard disk that stores map information and so on, input and output ports, a communication port, and so on, a GPS antenna that receives information on the current position of the vehicle, and a touch-panel display that displays various information such as information on the current position of the vehicle and a travel route to a destination and that allows an operator to input various instructions. Herein, as the map information, service information (e.g. sightseeing information, parking lots, battery charging stations, etc.), road information per travel section determined in advance (e.g. between traffic lights, between intersections, etc.), and so on are stored in a database. The road information includes distance information, width information, area information (urban area, suburban area), type information (general road, expressway), gradient information, legal speed limit, the number of traffic lights, and so on. A parking lot at home and a desired spot can be point-registered as service information. When a destination is set by the operator, the navigation device 90 searches for a travel route from a current position of the vehicle to the destination based on the map information, the current position of the vehicle, and the destination and outputs the retrieved travel route to the display to perform route guidance. The navigation device 90 also calculates route information in the travel route (e.g. a remaining distance Ln to the destination, a direction Dn of the destination, etc.). The navigation device 90 is connected to the HVECU 70 via the communication port.

Although not shown, the HVECU 70 is configured as a microprocessor including a CPU as its main component and, in addition to the CPU, includes a ROM that stores processing programs, a RAM that temporarily stores data, a flash memory 72, input and output ports, and a communication port. Signals from various sensors are input to the HVECU 70 via the input port. As the signals that are input to the HVECU 70, there can be cited, for example, an ignition signal from an ignition switch 80, a shift position SP from a shift position sensor 82, an accelerator opening degree Acc from an accelerator pedal position sensor 84, a brake pedal position BP from a brake pedal position sensor 86, a vehicle speed V from a vehicle speed sensor 88; and the like signals. There can further he cited a fuel quantity Qf from a fuel gauge 25a attached to the fuel tank 25, a connection signal SWC from a connection switch 62 that is attached to the charging inlet 61 and determines whether or not the charging inlet 61 (the charger 60) is connected to the charger cable 69a (the external power source 69), and so on. The following signals are output from the HVECU 70 via the output port: a control signal to the charger 60; an opening/closing control signal to the charging inlet lid 63; a control signal to the air-conditioning device 91; a display control signal to the display device 92 attached to an instrument panel; an audio control signal to the speaker 93; and the like signals. As described above, the HVECU 70 is connected to the engine ECU 24, the motor ECU 40, the battery ECU 52, and the navigation device 90 via the communication port. The HVECU 70 transmits information to a vehicle external device such as the charging facility 68 at the battery charging point and receives information from the vehicle external device via the communication device 94. When the fuel tank 25 is refueled, the HVECU 70 calculates a refueled quantity based on a fuel quantity Qf from the fuel gauge 25a.

The hybrid vehicle 20 of the embodiment configured as described above performs hybrid travel (HV travel) or electric travel (EV travel) in a Charge Depleting (CD) mode or a Charge Sustaining (CS) mode. Herein, the CD mode is a mode that gives priority to the EV travel as compared to the CS mode. The HV travel is a mode of traveling with the operation of the engine 22. The EV travel is a mode of traveling without the operation of the engine 22.

In the embodiment, when the charging inlet lid 63 is opened and the charging inlet 61 (the charger 60) is connected to the charger cable 69a (the external power source 69) while the vehicle is stopped with the system off (with the system stopped) at a battery charging point such as at home or in a battery charging station, the HVECU 70 controls the charger 60 to charge the battery 50 using electric power from the external power source 69. When the state of charge SOC of the battery 50 is greater than a threshold value Shv1 (e.g., 45%, 50%, or 55%) upon turning on the system (upon starting the system), the vehicle travels in the CD mode until the state of charge SOC of the battery 50 reaches a threshold value Shv2 (e.g., 25%, 30%, or 35%) or less, while, after the state of charge SOC of the battery 50 reaches the threshold value Shv2 or less, the vehicle travels in the CS mode until the system is turned off. On the other hand, when the state of charge SOC of the battery 50 is less than or equal to the threshold value Shv1 upon turning on the system, the vehicle travels in the CS mode until the system is turned off.

Figure 2:
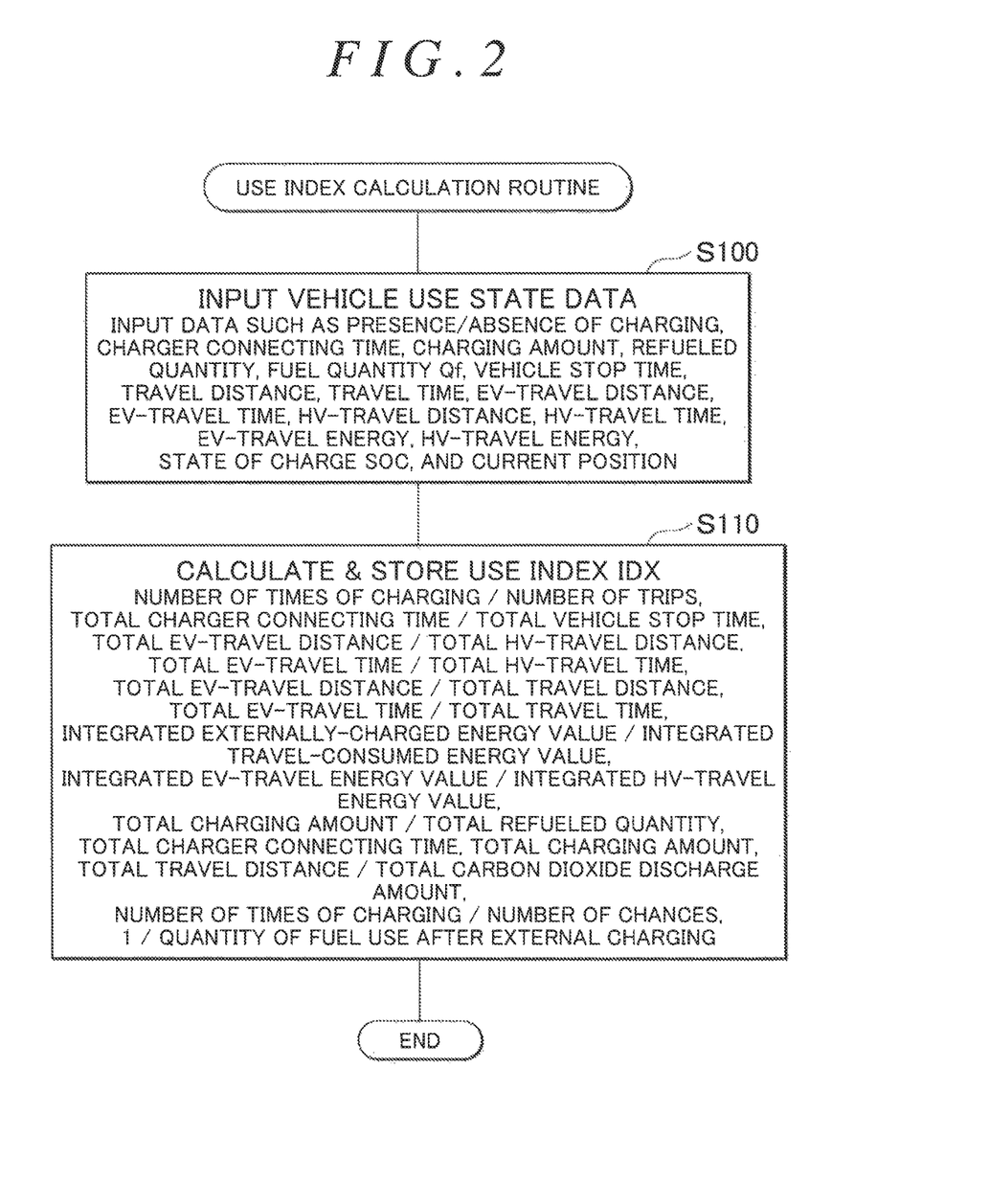
FIG. 2 is a flowchart illustrating an example of a use index calculation routine executed by an HVECU 70.
Figure 3:
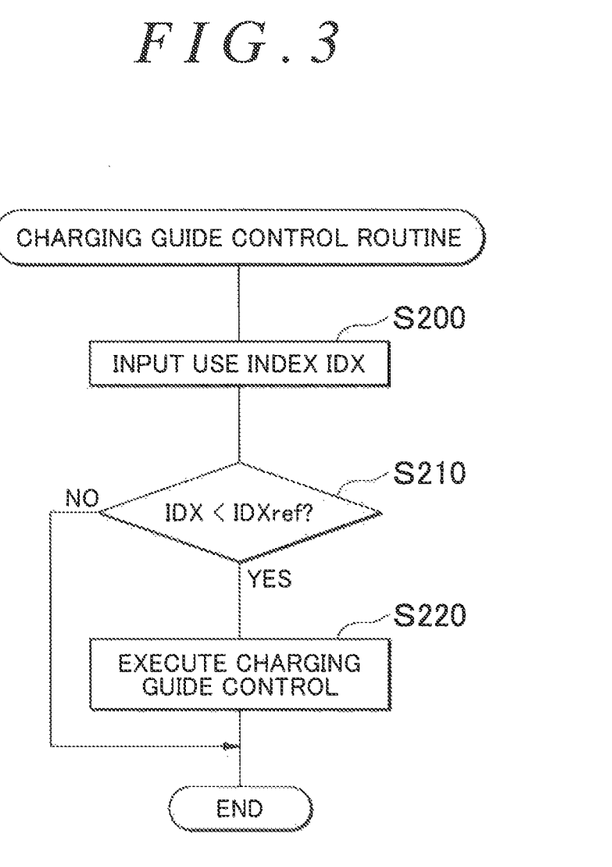
FIG. 3 is a flowchart illustrating an example of a charging guide control routine executed by the HVECU 70.

Next, a description will be given of the operation of the hybrid vehicle 20 of the embodiment thus configured, particularly the operation of the hybrid vehicle 20 when a use index IDX indicating a degree of use of charging (external charging) of the battery 50 by the charger 60 is small, i.e., when the degree of use of external charging is low. FIG. 2 is a flowchart illustrating an example of a use index calculation routine that is executed by the HVECU 70. FIG. 3 is a flowchart illustrating an example of a charging guide control routine that is executed by the HVECU 70. Hereinbelow, these routines will be described in order.

First described is the use index calculation routine of FIG. 2. The routine is executed at a predetermined start timing. The predetermined start timing is a timing when the system is turned on (the system is started), a timing when the system is turned off (the system is stopped), a timing when charging of the battery 50 is completed by connecting the charging inlet 61 (the charger 60) to the charger cable 69a (the external power source 69), or a timing when the fuel tank 25 is refueled. Hereinbelow, a description will be given assuming that this routine is executed when the system is turned on (the system is started).

When the use index calculation routine is executed, the HVECU 70 first performs a process of inputting data that reflect vehicle use states and are necessary for calculating a use index IDX in a predetermined time period (step S100). Herein, as a "predetermined time period", it is possible to use a time period that is determined in advance in terms of time, such as one month or two months, a time period that is determined in advance in terms of occasion, such as during 20 trips or during 30 trips, or the like. The "trip" is defined as follows: one trip is a period from when the system of the hybrid vehicle is turned on (the system is started) to when the system is turned off (the system is stopped). As "data that reflect vehicle use states," there can be cited, as data from the system-off timing of the last trip to the system-on timing of the current trip, the presence/absence of charging of the battery 50 by the charger 60 (the presence/absence of external charging), a charging time (a charger connecting time) for which the charging inlet 61 (the charger 60) is connected to the charger cable 69a (the external power source 69), and a charging amount of the battery 50 by the charger 60. There can also be cited a refueled quantity, a fuel quantity Qf, a vehicle stop time from the system-off timing of the last trip to the system-on timing of the current trip, a travel distance in the last trip, and a travel time in the last trip. Further, there can be cited an EV-travel distance in the last trip, an EV-travel time in the last trip, an HV-travel distance in the last trip, and an HV-travel time in the last trip. Further, there can be cited an energy (an EV-travel energy) consumed by EV travel in the last trip, an energy (an HV-travel energy) consumed by HV travel in the last trip, a state of charge SOC, a current position of the vehicle, and so on.

After the data necessary for calculating the use index IDX are input as described above, the HVECU 70 calculates a use index IDX using the input data and stores the calculated use index IDX in the RAM (not shown) and the flash memory 72 of the HVECU 70 (step S110), and ends this routine. The use index IDX is calculated such that the greater the use index IDX, the better the use of charging (external charging) of the battery 50 by the charger 60.

In the embodiment, the use index IDX is calculated as one of (1) to (14) given below or is calculated based on one or a plurality of (1) to (14). (1) The use index IDX is calculated as a ratio of the number of times of charging to the number of trips (the number of times of charging/the number of trips), or is calculated based on the ratio. The number of times of charging can be obtained by counting based on the presence/absence of external charging in the predetermined time period. The presence/absence of external charging can be detected by determining whether or not the charging inlet 61 (the charger 60) is connected to the charger cable 69a (the external power source 69) based on a connection signal SWC from the connection switch 62, or by determining an increase in the state of charge SOC of the battery 50. The number of trips can be obtained by counting every time the system is turned on in the predetermined time period. (2) The use index IDX is calculated as a ratio (total charger connecting time/total vehicle stop time) of a total time for which the charger 60 is connected to the external power source 69 to a total time for which the vehicle is stopped with system off, or is calculated based on the ratio. The total charger connecting time can be obtained by integrating the charging time for which the charging inlet 61 (the charger 60) is connected to the charger cable 69a (the external power source 69) in the predetermined time period. The total vehicle stop time can be obtained by integrating the vehicle stop time between the trips in the predetermined time period. (3) The use index IDX is calculated as a ratio (total EV-travel distance/total HV-travel distance) of a total distance of EV travel to a total distance of HV travel, or is calculated based on the ratio. The total EV-travel distance can be obtained by integrating the EV-travel distances in the trips in the predetermined time period. The total HV-travel distance can be obtained by integrating the HV-travel distances in the trips in the predetermined time period. (4) The use index IDX is calculated as a ratio (total EV-travel time/total HV-travel time) of a total time of EV travel to a total time of HV travel or is calculated based on the ratio. The total EV-travel time can be obtained by integrating the EV-travel time in the trips in the predetermined time period. The total HV-travel time can be obtained by integrating the HV-travel time in the trips in the predetermined time period. (5) The use index IDX is calculated as a ratio (total EV-travel distance/total travel distance) of a total distance of EV travel to a total travel distance or is calculated based on the ratio. The total travel distance can he obtained by integrating the travel distances in the trips in the predetermined time period. (6) The use index IDX is calculated as a ratio (total EV-travel time/total travel time) of a total time of EV travel to a total travel time or is calculated based on the ratio. The total travel time can be obtained by integrating the travel time in the trips in the predetermined time period. (7) The use index IDX is calculated as a ratio (total charging amount/total refueled quantity) of a total charging amount of charging of the battery 50 by the charger 60 to a total refueled quantity to the fuel tank 25 or is calculated based on the ratio. The total charging amount can be obtained by integrating the charging amounts by external charging in the predetermined time period. The total refueled quantity can be obtained by integrating the refueled quantities in the predetermined time period. (8) The use index IDX is calculated as a ratio (integrated externally-charged energy value/integrated travel-consumed energy value) of an integrated value of an energy charged to the battery 50 by electric power from the external power source 69 to an integrated value of an energy consumed by travel. The integrated externally-charged energy value can be obtained by integrating the charging amounts by external charging in the predetermined time period. The integrated travel-consumed energy value can be obtained as an integrated value of EV-travel energy and HV-travel energy. The EV-travel energy or the HV-travel energy can be obtained by time-integrating the product of a vehicle weight M and a vehicle speed V ($\int M \cdot V dt$) during EV travel or HV travel. As the vehicle weight M, it is possible to use a value measured by a vehicle weight sensor, a value calculated based on data from a gradient sensor and the torque and acceleration of the motor MG2, or a value determined in advance. (9) The use index IDX is calculated as a ratio (integrated EV-travel energy value/integrated HV-travel energy value) of an integrated value of an energy consumed by EV travel to an integrated value of an energy consumed by HV travel or is calculated based on the ratio. The integrated EV-travel energy value can be obtained by integrating the EV-travel energy. The integrated HV-travel energy value can be obtained by integrating the HV-travel energy. (10) The use index IDX is calculated as a total time (total charger connecting time) for which the charger 60 is connected to the external power source 69 or is calculated based on the total time. The total charger connecting time can be obtained by integrating the time for which the charging inlet 61 (the charger 60) is connected to the charger cable 69a (the external power source 69) in the predetermined time period. (11) The use index IDX is calculated as a total charging amount of the battery 50 by the charger 60 or is calculated based on the total charging amount. The total charging amount can be obtained by integrating the charging amounts by external charging in the predetermined time period. (12) The use index IDX is used as a ratio (total travel distance/total carbon dioxide discharge amount) of a traveled total travel distance to a total discharge amount of carbon dioxide or is calculated based on the ratio. The total carbon dioxide discharge amount can be calculated as the sum of the product of the total refueled quantity and a fuel coefficient and the product of the total charging amount and an external charging coefficient. (13) The use index IDX is calculated as a ratio (the number of times of charging in chance/the number of chances) of, to the number of charging chances (the number of chances) in a state where the vehicle can be externally charged, the number of times of carrying out external charging in that state (the number of times of charging in chance), or is calculated based on the ratio. The number of chances can be obtained by counting the number of times in which the vehicle was parked in a parking lot at home or in a battery charging station in the predetermined time period. Whether or not the vehicle is parked in the parking lot at home or in the battery charging station can be determined by determining whether or not the current position of the vehicle from the navigation device 90 is the parking lot at home or the battery charging station. The number of times of charging can be obtained by counting the number of times in which the vehicle was parked in the parking lot at home or in the battery charging station and charged in the predetermined time period. (14) The use index IDX is calculated as an inverse (1/quantity of fuel use after external charging) of a quantity of fuel use by the internal combustion engine after external charging or is calculated based on the ratio. The quantity of fuel use after external charging can be calculated based on a fuel quantity Qf when the external charging was carried out, a refueled quantity, and a current fuel quantity Qf.

Next will be described a charging guide control routine of FIG. 3. The routine is performed when the hybrid vehicle 20 is pared at a battery charging point, When the charging guide control routine of FIG. 3 is executed, the HVECU 70 inputs the use index IDX (step S200) and compares the use index IDX thus input with a threshold Iref (step S210). Here, the threshold value Iref is determined in advance as a threshold value for determining that the degree of use of external charging is low (the use of external charging is not performed preferably).

When the use index IDX is the threshold Iref or more, it is determined that the degree of use of external charging is not low, and this routine is finished. In the meantime, when the use index IDX is less than the threshold Iref, it is determined that the degree of use of external charging is low, and a charging guide control to promote the use of external charging is executed (step S220). Here, the routine is finished.

As the charging guide control, at least one of the following is performed in the present embodiment: displaying of a message "please carry out external charging" or the like (information to promote the use of external charging) on the display device 92; an audio output from the speaker 93; automatic opening of the charging inlet lid 63; permission (preorder) of setting of pre-air conditioning by the air-conditioning device 91 at the time when the charging inlet 61 (the charger 60) is connected to the charger cable 69a (the external power source 69); and output of an alarm from the speaker 93 until the charging inlet 61 (the charger 60) is connected to the charger cable 69a (the external power source 69).

Thus, when the use index IDX is small, that is, the degree of use of external charging is low, the charging guide control is executed at the time of parking at a battery charging point, thereby making it possible to promote a driver to use external charging. As a result, the use of external charging can be promoted.

Note that, as the charging guide control, in addition to or instead of the above process, the following control is conceivable: when the charging inlet 61 (the charger 60) is connected to the charger cable 69a (the external power source 69), ready-off, that is, system off (system stop) is permitted or executed; or when the charging inlet 61 (the charger 60) is connected to the charger cable 69*a* (the external power source 69), key lock is enabled.

In the hybrid vehicle 20 of the embodiment described above, when the use index IDX indicative of the degree of use of external charging is less than the threshold Iref, the charging wide control to promote the use of external charging is executed at the time of parking at a battery charging point, such as at home or in a charging stand, where the external charging is performable. By promoting the driver to use external charging at the time of parking at the battery charging point as such, the use of external charging can be promoted. This makes it possible to achieve a reduction in environment load.

Figure 4:
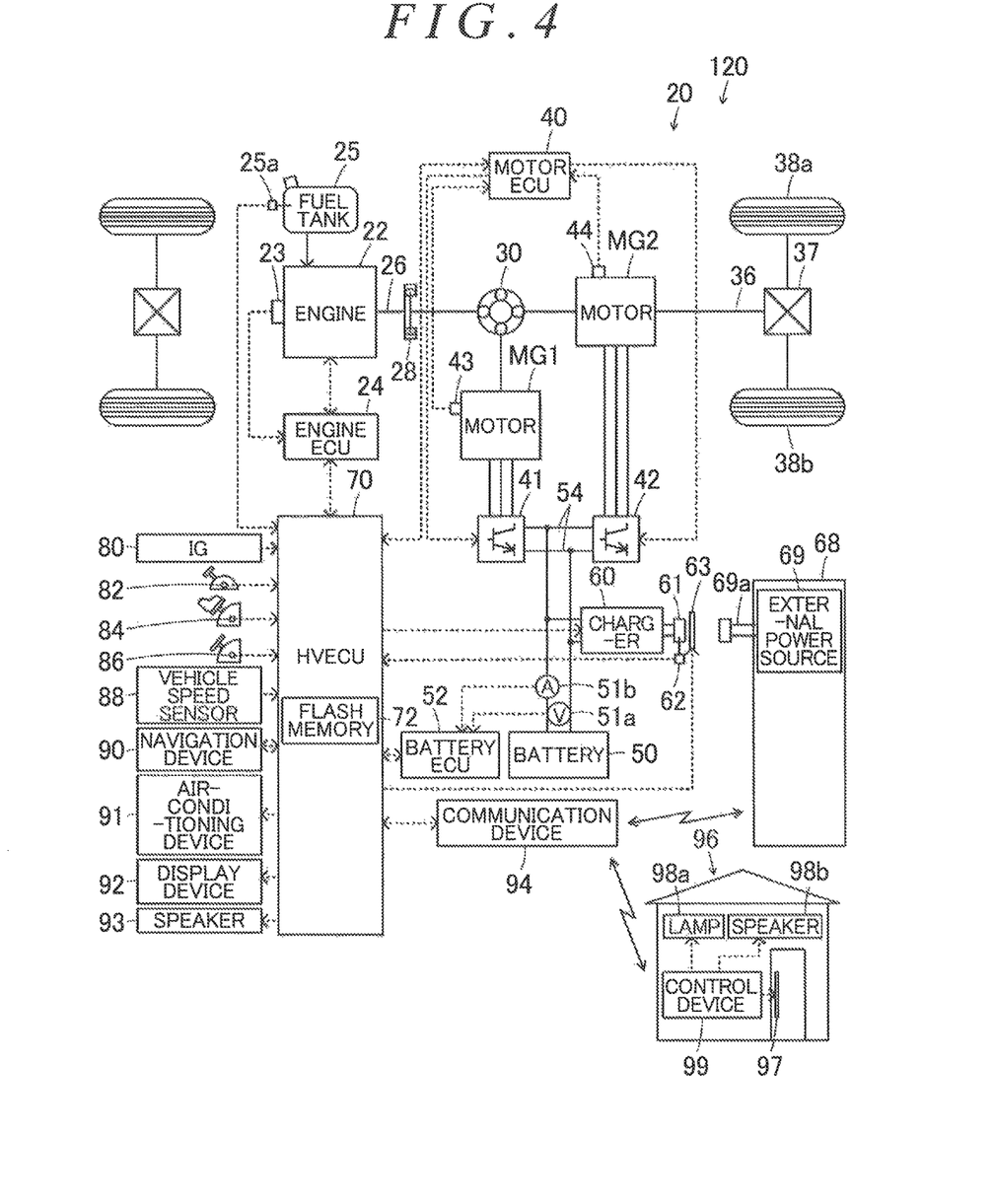
FIG. 4 is a configuration diagram schematically illustrating a configuration of a cooperation system 120.

In the hybrid vehicle 20 of the embodiment, when the use index IDX is less than the threshold Iref, the charging guide control is executed at the time of parking at the battery charging point where the external charging is performable. However, as illustrated in FIG. 4, in a cooperation system 120 in which the hybrid vehicle 20 is communicable with a home 96 as the vehicle external device, when the hybrid vehicle 20 is parked at the home 96, the following configuration is also conceivable. Here, the home 96 is provided with a locking release device 97 that prohibits unlocking of an entrance, a lamp 98*a*, a speaker 98*b*, a control device 99, and the like. The control device 99 controls the locking release device 97, the lamp 98*a*, and the speaker 98*b* and can communicate with the HVECU 70 via the communication device 94.

In the cooperation system 120, when the hybrid vehicle 20 is parked at the home 96 (the battery charging point) with the use index IDX being less than the threshold Iref, the hybrid vehicle 20 transmits the use index IDX or a request of the charging guide control to the control device 99. When the control device 99 receives the use index IDX or the request of the charging guide control, the control device 99 performs, as the charging guide control, prohibition of unlocking of the entrance by the locking release device 97, lighting of the lamp 98*a*, or output of an alarm from the speaker 98*b* until the charging inlet 61 (the charger 60) is connected to the charger cable 69*a* (the external power source 69). Even in this case, by promoting the driver to use external charging at the time of parking at the battery charging point, the use of external charging can be promoted. This makes it possible to achieve a reduction in environment load.

Note that, in the cooperation system 120, the vehicle external device is not limited to the home 96 provided with the locking release device 97, the lamp 98*a*, the speaker 98*b*, the control device 99, and the like. Accordingly, the same configuration as above is applicable even at the time of parking at a battery charging point except the home 96.

In the hybrid vehicle 20 of the embodiment, the HVECU 70 executes the use index calculation routine of FIG. 2 and the charging guide control routine of FIG. 3. However, the HVECU 70 may execute the use index calculation routine of FIG. 2 and a charging guide control routine of FIG. 5 instead of the charging guide control routine of FIG. 3.

Figure 5:
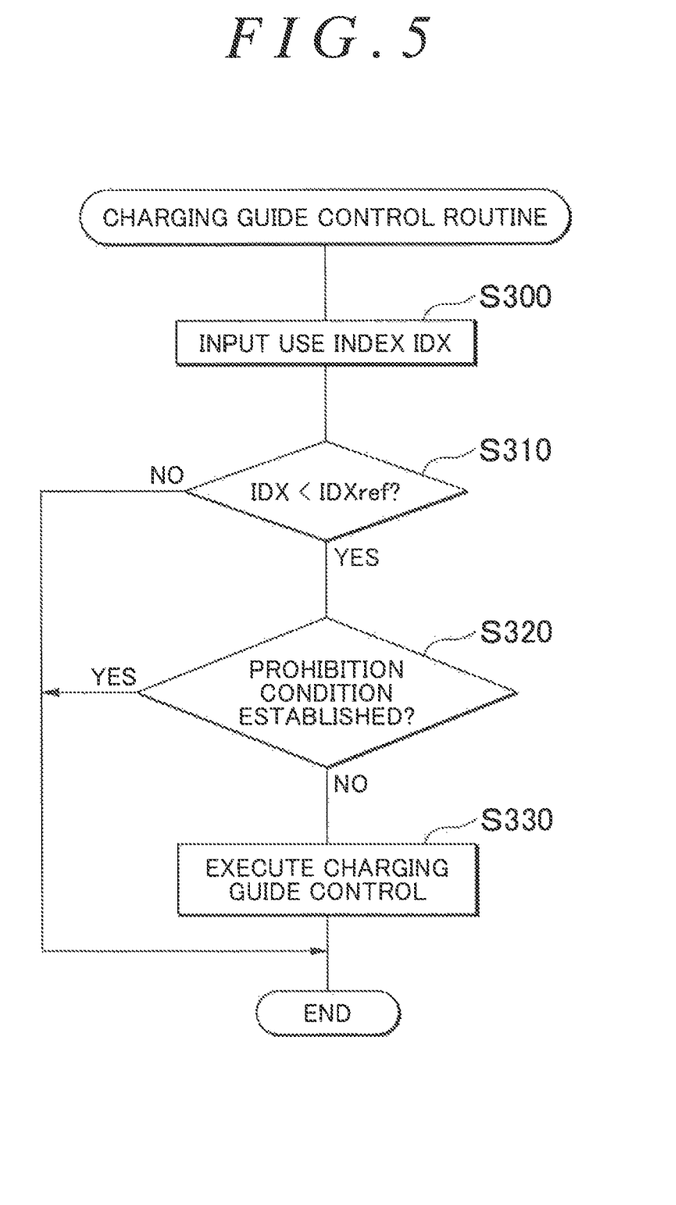
FIG. 5 is a flowchart illustrating an example of a charging guide control routine in a modification.

When the charging guide control routine of FIG. 5 is executed, the HVECU 70 inputs an use index IDX (step S300), similarly to the processes of steps S200 and S210 of the charging guide control routine of FIG. 3, and compares the use index IDX thus input with the threshold Iref (step S310). When the use index IDX is the threshold Iref or more, it is determined that the degree of use of external charging is not low, and this routine is finished.

When the use index IDX is less than the threshold Iref in step S310, the HVECU 70 determines that the degree of use of external charging is low and determines whether or not a prohibition condition of the charging guide control is established (step S320). Here, as the prohibition condition, it is possible to use at least one of a condition that does not require execution of external charging and a condition that cannot carry out external charging.

As the condition that does not require execution of external charging, at least one of the following conditions can be used: a condition that the battery 50 is fully charged; and a condition that a current battery charging point is not a predetermined battery charging point including the home. It is possible to determine whether or not the battery 50 is fully charged by use of the state of charge SOC of the battery 50 from the battery ECU 52. It is possible to determine whether or not the current battery charging point is the predetermined (registered) battery charging point including the home, by use of data from the navigation device 90.

As the condition that cannot carry out external charging, at least one of the following conditions can be used: a condition that the charging facility 68 of the battery charging point is during a power failure; a condition that the external power source 69 has an abnormality; and a condition that a connection with the external power source 69 is occupied by another vehicle. It is possible to determine, by use of a result of a communication with the charging facility 68, whether or not the charging facility 68 of the battery charging point is during a power failure, whether or not the external power source 69 has an abnormality, and whether or not the connection (the charger cable 69*a*) with the external power source 69 is occupied by another vehicle.

When the prohibition condition of the charging guide control is not established, the charging guide control is executed (step S330), and the routine is finished, in the meantime, when the prohibition condition of the charging guide control is established, the charging guide control is not executed, and the routine is finished. Hereby, it is possible to avoid executing the charging guide control when it is not necessary to carry out external charging or when external charging is not performable. As a result, it is possible to avoid making a user feel inconvenience needlessly.

The hybrid vehicle 20 of the embodiment includes the charger 60 that charges the battery 50 by connecting the charging inlet 61 (the charger 60) to the charger cable 69*a* (the external power source 69), but may include a charger that charges the battery 50 by receiving electric power from the external power source 69 in a non-contact manner.

Figure 6:
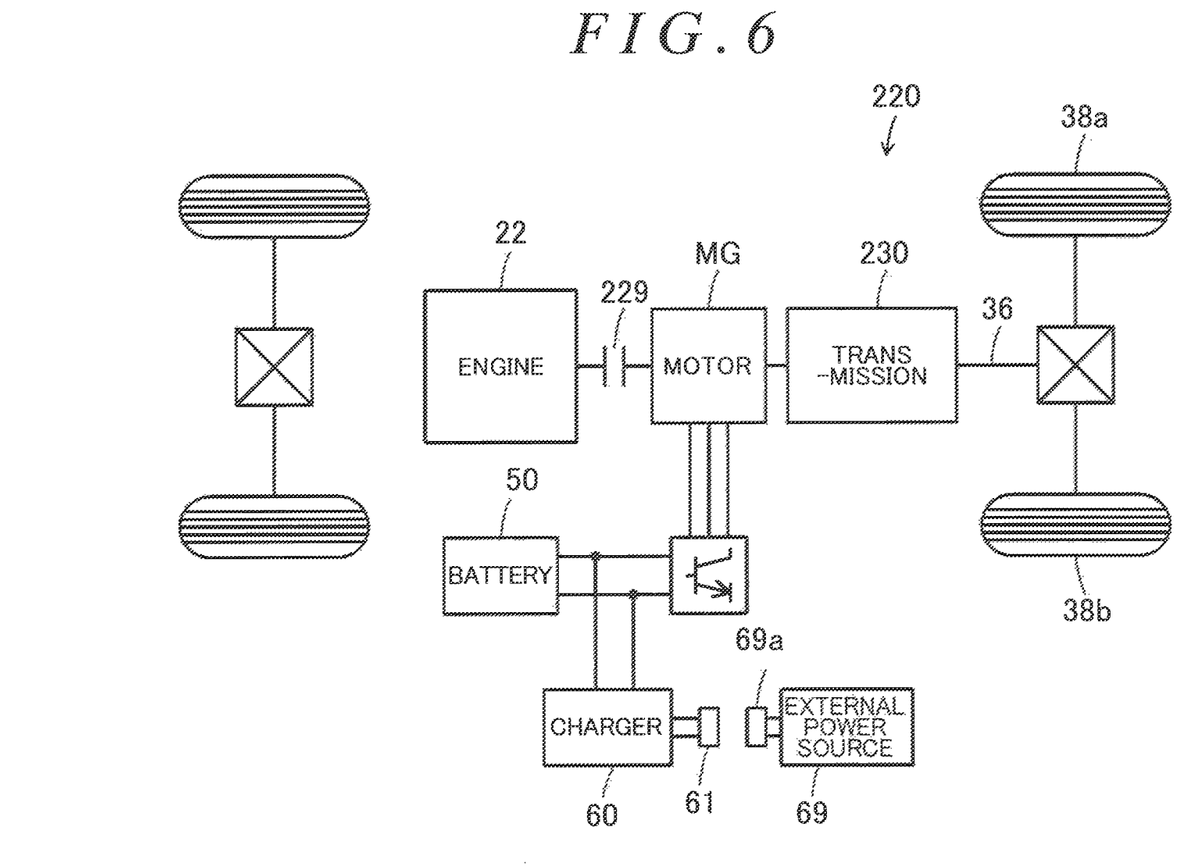
FIG. 6 is a configuration diagram schematically illustrating a configuration of a hybrid vehicle 220 in another modification.

In the hybrid vehicle 20 of the embodiment, the engine 22, the motor MG1, and the drive shaft 36 are connected to the planetary gear 30, and the motor MG2 is connected to the drive shaft 36. As exemplified in a hybrid vehicle 220 of a modification in FIG. 6, a motor MG may be connected to a drive shaft 36 connected to driving wheels 38*a*, 38*b* via a transmission 230, and an engine 22 may be connected to a rotating shaft of the motor MG via a clutch 229, so that power from the engine 22 is output to the drive shaft 36 via the rotating shaft of the motor MG and the transmission 230, and power from the motor MG is output to the drive shaft via the transmission 230. Further, a configuration of what is called a series hybrid vehicle may be employed. That is, any configuration may be employed, provided that the vehicle is a hybrid vehicle including an engine, a motor, a battery, and a charger that charges the battery by being connected to an external power source.

The following describes a correspondence between main elements of the embodiment and main elements of the disclosure described in the field of Means for Solving Problem. In the present embodiment, the engine 22 corresponds to an "engine," the fuel tank 25 corresponds to a "fuel tank," the motor MG2 corresponds to a "motor," the battery 50 corresponds to a "battery," the charger 60 corresponds to a "charger," and the HVECU 70 that executes the use index calculation routine of FIG. 2 and the charging guide control routine of FIG. 3, the engine ECU 24, the motor ECU 40, and the battery ECU 52 correspond to an "electronic control unit" The HVECU 70, the engine ECU 24, the motor ECU 40, and the battery ECU 52 may be included in one electronic control unit.

Note that the correspondence between the main elements of the embodiment and the main elements of the disclosure as described in the field of Means for Solving Problem are just examples to specifically describe the mode for carrying out the disclosure, described in the field of Means for Solving Problem, so they are not limited to the elements of the disclosure described in the field of Means for Solving Problem. That is, the interpretation of the disclosure described in the field of Means for Solving Problem should be made based on the description of the field, and the embodiment is merely one concrete example of the disclosure described in the field of Means for Solving Problem.

The configuration to perform the present disclosure has been explained by use of the embodiment, but it is needless to say that the present disclosure is not limited to such an embodiment at all and may be performable in various embodiments as long as the various embodiments are not beyond the gist thereof.

The present disclosure is usable in a manufacture industry of the hybrid vehicle 20, and the like.

What is claimed is:

1. A hybrid vehicle comprising:
an engine;
a fuel tank that stores fuel to be supplied to the engine;
a motor;
a battery configured to supply electric power to the motor;
a charger configured to carry out external charging that charges the battery by use of electric power from an external power source; and
an electronic control unit configured to execute a charging guide control to promote use of external charging during parking at a battery charging point when a use index is less than or equal to a predetermined threshold value, the use index being an index to indicate a degree of use of external charging in a predetermined time period, the battery charging point being a point where the external charging is performable.

2. The hybrid vehicle according to claim 1, further comprising:
a display device, wherein
the electronic control unit is configured to execute a control to display information to promote the use of external charging on the display device when the electronic control unit executes the charging guide control.

3. The hybrid vehicle according to claim 1, further comprising:
a speaker, wherein
the electronic control unit is configured to execute at least one of an audio outputting control and an alarm outputting control when the electronic control unit executes the charging guide control, the audio outputting control is a control to output an audio from the speaker, the alarm outputting control is a control to output an alarm from the speaker until the charger is connected to the external power source.

4. The hybrid vehicle according to claim 1, wherein
the charger includes a charging inlet and a charging inlet lid,
the charging inlet is configured to be connected to a charger cable of the external power source, and
the charging inlet lid is configured to cover the charging inlet, and
the electronic control unit is configured to execute a control to open the charging inlet lid such that the charging inlet is connected to the charger cable when the electronic control unit executes the charging guide control.

5. The hybrid vehicle according to claim 1, further comprising:
an air-conditioning device, wherein
the electronic control unit is configured to execute a control to permit setting of pre-air conditioning by the air-conditioning device when the charger is connected to the external power source during executing the charging guide control by the electronic control unit.

6. The hybrid vehicle according to claim 1, wherein
the electronic control unit is configured not to execute the charging guide control at least one of a time when the external charging is unnecessary to carry out and a time when the external charging is not performable during parking at the battery charging point with the use index being less than or equal to the predetermined threshold value.

7. The hybrid vehicle according to claim 6, wherein
the time when the external charging is unnecessary to carry out is at least one of a time when the battery is fully charged and a time when a current battery charging point is not a predetermined battery charging point.

8. The hybrid vehicle according to claim 6, wherein
the time when the external charging is not performable is at least one of a time when a charging facility including the external power source at the battery charging point is during a power failure, a time when the external power source has an abnormality, and a time when a connection with the external power source is occupied by another vehicle.

9. A cooperation system comprising
a hybrid vehicle, and
a vehicle external device including a control device,
the hybrid vehicle including:
an engine;
a fuel tank that stores fuel to be supplied to the engine;
a motor;
a battery configured to supply electric power to the motor;
a charger configured to carry out external charging that charges the battery by use of electric power from an external power source;
a communication device configured to transmit information to the vehicle external device; and
an electronic control unit configured to transmit at least one of information of a use index and information of a request of a charging guide control to the vehicle external device by the communication device during parking at a battery charging point when the use index is less than or equal to a predetermined threshold value, the use index being an index to indicate a degree of use of the external charging in a predetermined time period, the battery charging point being a point where the external charging is performable, the charging guide control being a control to promote use of the external charging, the control device of the vehicle external device being configured to execute the charging guide control when the control device receives the information that is transmitted from the hybrid vehicle.

10. A control method for a hybrid vehicle the hybrid vehicle including
  an engine;
  a fuel tank that stores fuel to be supplied to the engine;
  a motor;
  a battery configured to supply electric power to the motor;
  a charger configured to carry out external charging that charges the battery by use of electric power from an external power source; and
  an electronic control unit,
the control method comprising:
executing, by the electronic control unit, a charging guide control to promote use of external charging during parking at a battery charging point when a use index is less than or equal to a predetermined threshold value, the use index being an index to indicate a degree of use of external charging in a predetermined time period, the battery charging point being a point where the external charging is performable.

\* \* \* \* \*